(12) United States Patent
Popp

(10) Patent No.: US 7,517,610 B2
(45) Date of Patent: Apr. 14, 2009

(54) RECHARGEABLE BATTERY WITH A CONNECTING POLE

(75) Inventor: Karlo Popp, Ronnenberg (DE)

(73) Assignee: VB Autobatterie GmbH (DE)

( * ) Notice: Subject to any disclaimer, the term of this patent is extended or adjusted under 35 U.S.C. 154(b) by 594 days.

(21) Appl. No.: 10/755,717

(22) Filed: Jan. 12, 2004

(65) Prior Publication Data

US 2004/0170892 A1 Sep. 2, 2004

(30) Foreign Application Priority Data

Jan. 13, 2003 (DE) ................. 103 01 043

(51) Int. Cl.
H01M 2/08 (2006.01)
H01M 2/02 (2006.01)
H01M 2/26 (2006.01)
H01M 2/06 (2006.01)

(52) U.S. Cl. .............. 429/181; 429/161; 429/175; 429/180

(58) Field of Classification Search .......... 429/161, 429/180, 181, 175
See application file for complete search history.

(56) References Cited

U.S. PATENT DOCUMENTS

| 1,960,200 | A | * | 5/1934 | Beetem ............... 429/183 |
| 3,434,883 | A | * | 3/1969 | Cretella et al. ............. 429/86 |
| 3,652,340 | A | * | 3/1972 | Sharpe et al. ............. 429/184 |
| 4,076,908 | A | * | 2/1978 | Backer et al. ............. 429/184 |
| 4,164,609 | A | * | 8/1979 | Jensen ............... 429/183 |
| 4,331,749 | A |   | 5/1982 | Hardigg et al. |
| 4,410,610 | A | * | 10/1983 | Quist ............... 429/181 |
| 4,495,260 | A | * | 1/1985 | Hardigg et al. ............. 429/180 |
| 4,775,604 | A | * | 10/1988 | Dougherty et al. ......... 429/178 |
| 4,859,547 | A | * | 8/1989 | Adams et al. ............. 429/121 |
| 5,273,845 | A | * | 12/1993 | McHenry et al. ............. 429/180 |
| 6,030,723 | A |   | 2/2000 | Nagano et al. |
| 6,309,429 | B1 | * | 10/2001 | Lund et al. ............. 29/623.1 |
| 6,440,180 | B2 | * | 8/2002 | Iwamura ............. 29/623.1 |

FOREIGN PATENT DOCUMENTS

| DE | 33 13419 | 10/1984 |
| GB | 1 547 752 | 6/1979 |
| GB | 2 123 205 | 1/1984 |
| JP | 61096660 | 5/1986 |

OTHER PUBLICATIONS

Search Report by European Patent Office for European Patent Application 03 02 7542; mailing date Jul. 28, 2006; 3 pgs.
Office Action for European Patent Application EP 03 027 542.4-2119; dated Jan. 25, 2007; 4 pages.

* cited by examiner

*Primary Examiner*—Mark Ruthkosky
*Assistant Examiner*—Karie O'Neill
(74) *Attorney, Agent, or Firm*—Foley & Lardner LLP

(57) ABSTRACT

A rechargeable battery includes a cover and at least one connecting pole comprising a pole shank inserted into a pole sleeve having an inner casing. The connecting pole is closed from the outside of the rechargeable battery such that it is liquid-tight and gas-tight. The pole sleeve is electrically conductively connected to the pole shank and is held in a liquid-tight and gas-tight manner by the cover. A first section of the pole shank is electrically conductively connected in a gas-tight and liquid-tight manner to the inner casing of the pole sleeve. A sliding element is provided between a second section of the pole shank and the inner casing of the pole sleeve.

12 Claims, 2 Drawing Sheets

RECHARGEABLE BATTERY WITH A CONNECTING POLE

CROSS-REFERENCE TO RELATED PATENT APPLICATIONS

The present Application claims the benefit of priority, as available under 35 U.S.C. § 119, to German Patent Application DE 103 01 043.2-45, filed on Jan. 13, 2003, which is incorporated herein by reference in its entirety, including the specification, drawings, claims and abstract.

FIELD

The present invention relates generally to the field of rechargeable batteries. Specifically, the present invention relates to the field of rechargeable batteries having at least one connecting pole.

BACKGROUND

In rechargeable batteries (e.g., lead-acid batteries for use in vehicle starting, lighting, and ignition applications; marine batteries, commercial batteries, industrial batteries, etc.), a pole shank is attached to an electrode end plate, and a pole sleeve is formed in the cover of the rechargeable battery. When the rechargeable battery is assembled, the pole sleeve is pushed onto the pole shank during the fitting of the cover. The pole sleeve and the pole shank are also connected to one another in a gas-tight and liquid-tight manner in order to form a connecting pole. Furthermore, an electrically conductive connection has to be produced between the pole sleeve and the pole shank. For this purpose, the external dimensions of the pole shank are substantially identical to the internal dimensions of the pole sleeve. In consequence, the pole sleeve and the pole shank touch when the pole sleeve is being fitted to the pole shank. Since the pole shank and the pole sleeve are composed of materials (e.g., lead) which will not slide well on one another, considerable friction occurs when they are being fitted to one another. One difficulty is that a sufficiently large amount of friction may exist such that the pole sleeve cannot be pushed onto the pole shank unless a large amount of force is exerted, and closing of a rechargeable battery cover can then lead to bending of the pole shank or to deformation of the cover of the rechargeable battery.

U.S. Pat. No. 6,030,723 discloses a rechargeable battery in which the pole sleeve can be fitted over the pole shank more easily, and which is produced without any welding of the pole sleeve and pole shank. The pole sleeve is in this case closed at one end by an end section which is used to hold the pole shank firmly, and thus on its own (i.e., without the pole shank) forms a closure at the outside. The inner casing of the pole sleeve thus runs in a wedge shape from an insertion end as far as the end section, such that, when the pole shank is introduced, an intermediate space is formed between the pole shank and the pole sleeve over the entire length of the pole shank. This makes it easier to push the pole sleeve and pole shank along. The intermediate space towards the end section is filled with an electrically conductive adhesive in order to firmly and electrically conductively connect the pole sleeve to the pole shank. The electrically conductive adhesive may, however, be subject to aging processes and may thus lead to an electrical connection which becomes weaker over the course of time.

Furthermore, U.S. Pat. No. 6,030,723 also discloses a further embodiment of the pole sleeve which has a conical insertion section at the end facing the rechargeable battery housing. The conical insertion section extends axially over more than half the pole sleeve. Towards the end section, the internal dimensions of the pole sleeve are approximately the same as the external dimensions of the pole shank. The aim of this is to produce an electrically conductive content just by the touching of the two parts. In addition, the electrically conductive connection between the pole sleeve and the pole shank can also be improved by using a tool to press the end surface on to the pole shank from the outside. Although the conical insertion section makes it easier to insert the pole shank into the pole sleeve, it is nevertheless difficult to completely insert the pole shank as far as the end section of the pole sleeve. Furthermore, pushing the two parts on to one another as proposed results in the homogeneity of the electrical connection between the parts being poorer than welding.

It would be advantageous to provide a rechargeable battery such that final assembly of the battery is simplified and, at the same time, a good electrically conductive connection is produced between the pole sleeve and the pole shank. Those of skill in the art will also recognize other advantageous features provided by the subject matter disclosed herein.

SUMMARY

The present invention relates to a rechargeable battery that includes a cover and at least one connecting pole comprising a pole shank inserted into a pole sleeve having an inner casing. The connecting pole is closed from the outside of the rechargeable battery such that it is liquid-tight and gas-tight. The pole sleeve is electrically conductively connected to the pole shank and is held in a liquid-tight and gas-tight manner by the cover. A first section of the pole shank is electrically conductively connected in a gas-tight and liquid-tight manner to the inner casing of the pole sleeve. A sliding element is provided between a second section of the pole shank and the inner casing of the pole sleeve.

DETAILED DESCRIPTION OF THE PREFERRED AND EXEMPLARY EMBODIMENTS

Figure 1:
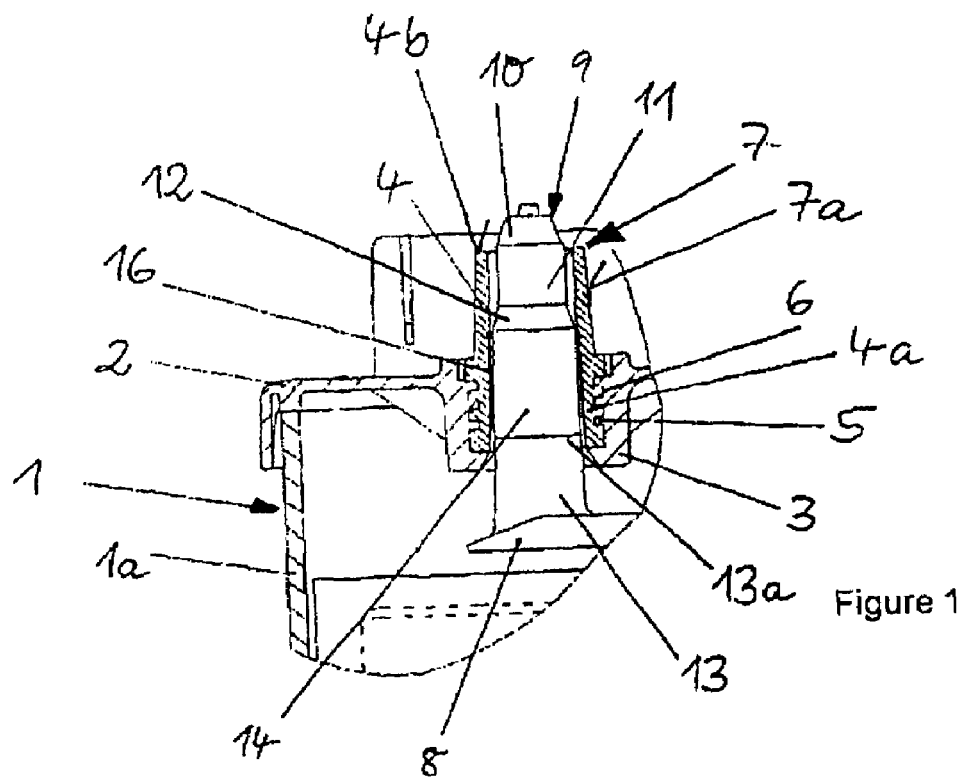
FIG. 1 is a cross-sectional view of a portion of a rechargeable battery according to an exemplary embodiment.

An exemplary embodiment relates to a rechargeable battery having at least one connecting pole, which is closed from the outside such that it is liquid-tight and gas-tight and has a pole shank which is inserted into a pole sleeve, with the pole sleeve being electrically conductively connected to the pole shank, and with the pole sleeve being held in a liquid-tight and gas-tight manner by a cover.

According to an exemplary embodiment, a first section of the pole shank is electrically conductively connected, in a gas-tight and liquid-tight manner, to an inner casing (e.g., inner surface) of the pole sleeve which surrounds it. A sliding element is provided between a second section of the pole shank and the inner casing of the pole sleeve.

According to an exemplary embodiment, a sliding element is fitted between the pole shank and the pole sleeve. The sliding element then assists the process of fitting the pole sleeve to the pole shank, which advantageously allows the rechargeable battery to be brought to a state in which it is ready to operate. This ensures that the inner wall of the pole sleeve slides with little friction over the pole shank. In this case, the pole sleeve can easily be pushed over the pole shank even if the external dimensions of the pole shank and the internal dimensions of the pole sleeve are matched to one another such that a contact is produced between the pole sleeve and the pole shank by the pole sleeve being pushed on.

In consequence, such a configuration also makes it relatively simple to fit a pole sleeve to a pole shank, or to push it on, even if the pole sleeve surrounds the pole shank at the same distance from it at least in places. There is no need for conical shaping, for example, over the entire length of the pole shank in order to make it easier to push the pole sleeve on to the pole shank. According to an exemplary embodiment, the sliding element is provided such that it does not adversely affect the welding or soldering of the pole sleeve and pole shank in order to produce both the electrically conductive connection from the pole shank to the pole sleeve and to close the connecting pole in a gas-tight and liquid-tight manner.

One advantageous feature of such a configuration that such configuration largely avoids damage to the pole shank and/or to the pole sleeve when the pole sleeve is being pushed onto the pole shank.

According to an exemplary embodiment, the first section is provided at the free end of the pole shank, and the sliding element is surrounded, at least in places, by an attachment section of the pole sleeve, which is used for attachment of the pole sleeve to the cover. The first section preferably has a smaller diameter than the second section. The cavity which is formed around the first section in this way is particularly preferably filled with flowing solder in order to seal the connecting pole and in order to produce an electrically conductive connection between the pole sleeve and the pole shank.

According to another exemplary embodiment, the sliding element is in the form of an insert in the pole sleeve. Furthermore, the insert is preferably clamped into the pole sleeve. An insert such as this can advantageously be inserted during the manufacture of the pole sleeve. The sliding element is preferably integrally formed on the cover. In an embodiment such as this which is integrated with the cover, the sliding element can be manufactured in the same production step as the cover.

According to another exemplary embodiment, the sliding element may also be fitted to the second section of the pole shank. The sliding element may also be in the form of a covering which surrounds the second section of the pole shank, at least in places. If the second section of the pole shank does not have a standard diameter, the covering may then cover an area of the pole shank with the largest diameter. This has the advantageous feature that the rechargeable battery can be produced relatively easily, and that the sliding element may be in the form of a coating on the pole shank.

In the same way, the sliding element may be in the form of a ring which is provided on an insertion opening in the pole sleeve according to another exemplary embodiment. The ring may preferably be molded on, which results in the advantage that less material is used.

In order to reduce the friction, the sliding element is formed from a material having a relatively smooth surface and, furthermore and preferably, from an elastic material. The sliding material is particularly preferably formed from plastic, and preferably from polypropylene. A material such as this allows the pole sleeve to be pushed onto the pole shank with particularly little friction.

The invention will be explained in more detail in the following text using exemplary embodiments in conjunction with the attached FIGURES. In this case, FIGS. 1 to 4 each show a subsection of four different exemplary embodiments of the rechargeable battery.

According to FIG. 1, a rechargeable battery according to an exemplary embodiment has a housing 1 (e.g., a rechargeable battery housing) which is closed at the top by a cover 2 which engages over side walls 1a of the housing 1. A pole sleeve 4 is provided in a shank section 3 (which is fitted with a housing interior) of the cover 2. The pole sleeve 4, which is formed in the cover 2 during its production, has circumferential grooves 5 on an attachment section 4a which is surrounded by the shank section 3. The grooves 5 are filled with a plastic of the cover 2 in order to form a gas-tight and liquid-tight connection in the form of a labyrinth seal 6 between the cover 2 and the pole sleeve 4.

The pole sleeve 4 is fitted onto a tubular pole shank 9, which is connected to an end plate 8 of the rechargeable battery in order to form a connecting pole 7. In the process, a cap-like closure 10 on the pole shaft 9 projects out of an end 4b of the pole sleeve 4 facing away from the housing 1. An outer casing 7a of the connecting pole 7 is used for connection of a load, for example by means of a pole terminal (not shown).

A first substantially cylindrical section 11 of the pole shank 9, to which the connecting pole 7 is sealed in a gas-tight and liquid-tight manner, is provided underneath the cap-like closure 10. An electrically conductive connection is likewise provided from the pole sleeve 4 and the pole shank 9 on the first section 11.

The first section 11 is followed by a transitional region 12 with a cross section which increases in the direction of the housing interior. Towards the housing interior, the pole shank 7 includes a substantially cylindrical region 14 underneath the transitional region 12, to which a foot part 13 is connected.

The pole shank 9 is mounted by means of the foot part 13 on the end plate 8 of the electrode. The diameter of the cylindrical region 14 is only slightly smaller than the internal diameter of the pole sleeve 4.

Figure 2:
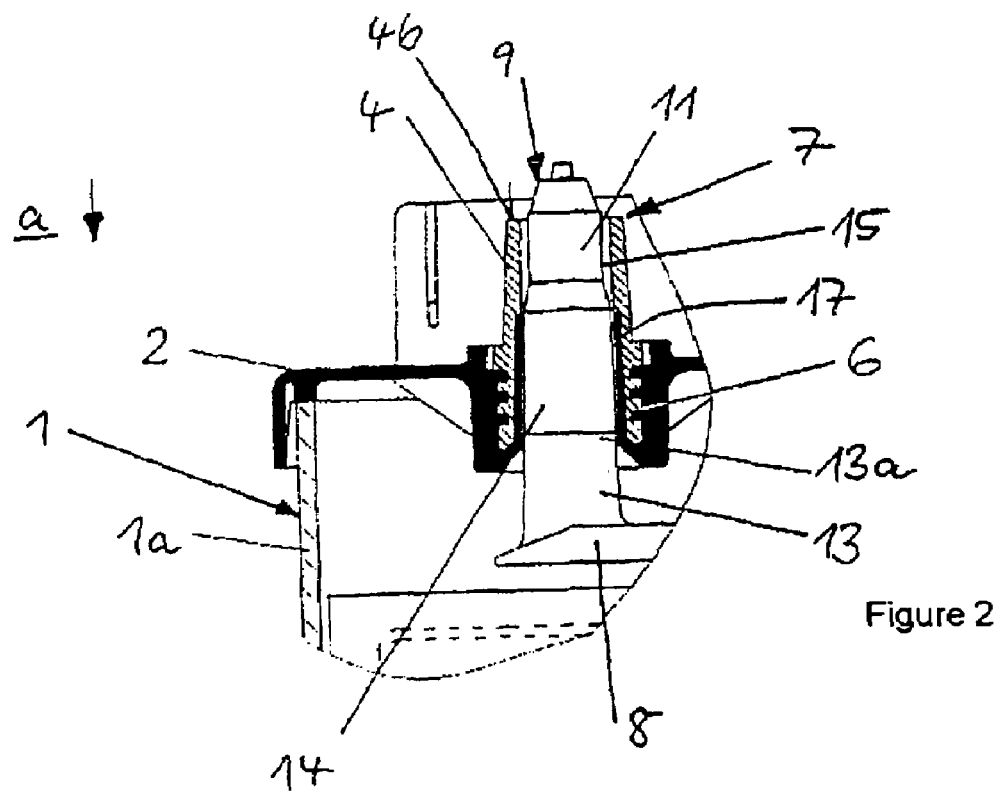
FIG. 2 is a cross-sectional view of a portion of a rechargeable battery according to another exemplary embodiment.
Figure 3:
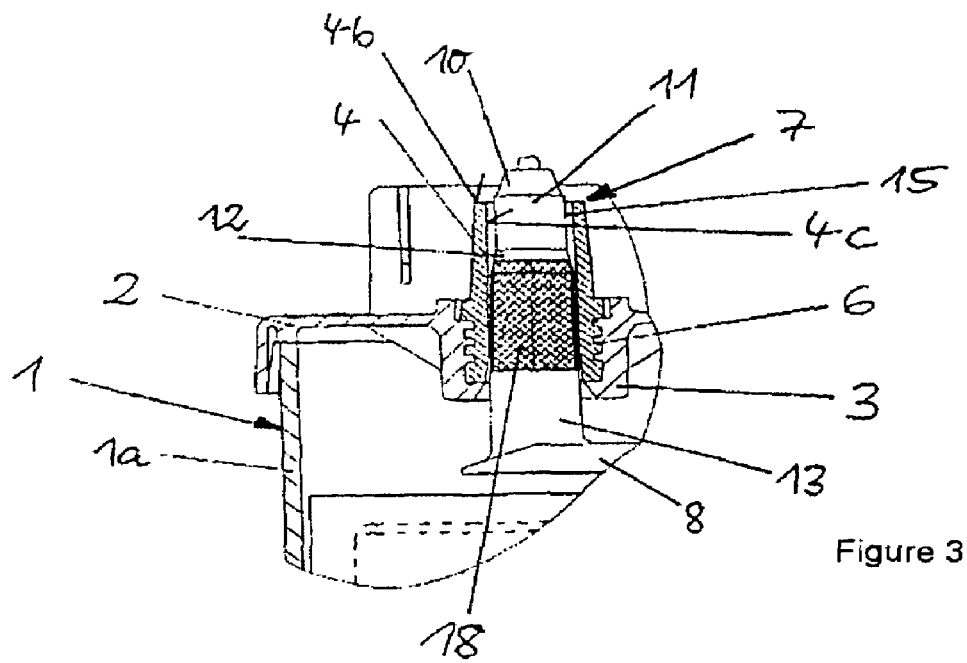
FIG. 3 is a cross-sectional view of a portion of a rechargeable battery according to another exemplary embodiment.

The diameter of the cylindrical section 11 is chosen such that an intermediate space 15 is formed around the cylindrical section 11 and in the inner casing 4c of the pole sleeve 4 (see e.g., FIG. 3). The intermediate space 15 is filled with lead solder along the direction indicated by the arrow a in FIG. 2 on the outside during a soldering process in order to produce a gas-tight and liquid-tight closure for the connecting pole 7, and in order to produce an electrically conductive connection between the pole shank 9 and the pole sleeve 4.

As shown in FIG. 1, the cylindrical region 14 and a region 13a of the foot part 13, which is surrounded by the pole sleeve 4 are surrounded by a sliding element 16 at the junction to the cylindrical region 14. Seen radially, the sliding element 16 is located between the regions 14, 13a of the pole shank 7 and a section of the inner casing 4c (see, e.g., FIG. 3) of the pole sleeve 4 surrounding it. The tubular sliding element 16 is composed of a material which contributes to reducing the friction between those parts of the pole sleeve 4 and pole shank 9 which are to be fitted to one another. The tubular sliding element 16 is in this case clamped into the pole sleeve 4. The cylindrical region 14 and the region 13a, which surrounds the pole sleeve 4, thus form a second section of the pole shank 7, in which the friction when the pole sleeve 4 is being pushed on is reduced.

FIG. 2 shows a rechargeable battery according to another exemplary embodiment in which a sliding element is integrally formed on the shank section 3 (which is like a hollow body) of the cover 2. In this case, the sliding element runs towards the upper end 4b of the pole sleeve 4 in the form of an insert 17 like a nozzle, which forms a contact surface for the cylindrical region 14 and the region 13a of the foot part 13 of the pole shank 9.

In another exemplary embodiment shown in FIG. 3, the pole shank has a covering 18 which completely surrounds the cylindrical region 14 and partially surrounds the transitional region 12. The covering 18 forms a contact surface for the internal casing 4c of the pole sleeve.

Figure 4:
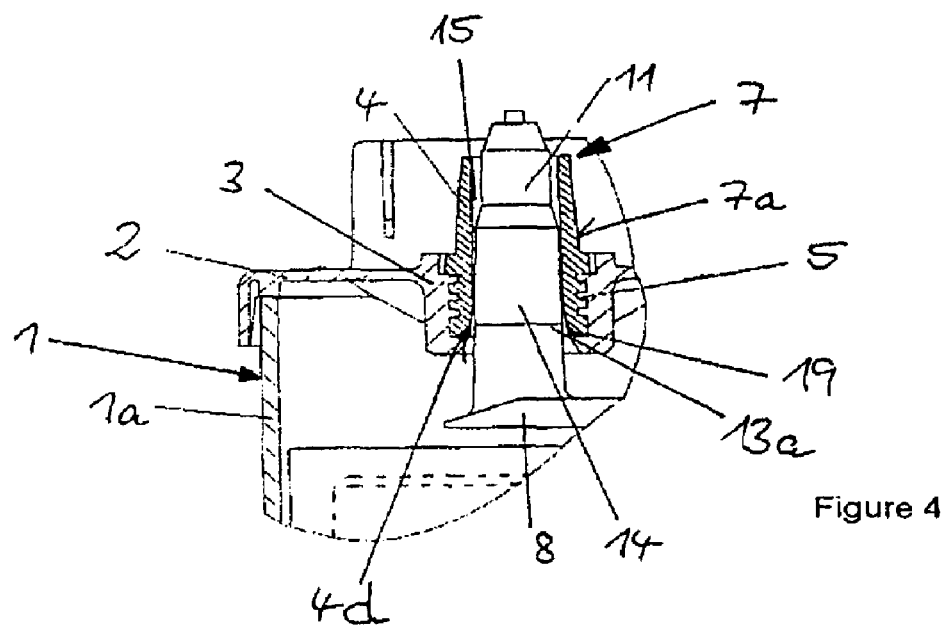
FIG. 4 is a cross-sectional view of a portion of a rechargeable battery according to another exemplary embodiment.

According to an exemplary embodiment shown in FIG. 4, a circumferential incline is provided on the lower face 4d (which is used as an insertion opening) of the pole sleeve 4, which enlarges the internal diameter of the pole sleeve 4. As is shown in FIG. 4, a plastic ring 19 is introduced into the incline such that it surrounds the region 13a of the foot part 13 of the pole shank 9. The plastic ring 19 is used as a sliding aid when the pole sleeve 4 is being fitted over the pole shank 9.

It is important to note that the construction and arrangement of the elements of the rechargeable battery as shown in the preferred and other exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials (such as high-impact plastic) in any of a wide variety of colors, textures and combinations. Other substitutions, modifications, changes and omissions may be made in the design, operating conditions and arrangement of the preferred and other exemplary embodiments without departing from the scope of the present inventions.

What is claimed is:

1. A rechargeable battery having a cover, the rechargeable battery comprising:
    at least one connecting pole comprising a pole shank inserted into a pole sleeve having an inner surface, the connecting pole being sealably mounted in the cover such that the rechargeable battery is liquid-tight and gas-tight, the pole shank comprising a first section and a second section, wherein the diameter of the first section is smaller than the diameter of the second section;
    wherein the pole sleeve is electrically conductively connected to the pole shank and is held in a liquid-tight and gas-tight manner by the cover;
    wherein the first section of the pole shank is electrically conductively connected in a gas-tight and liquid-tight manner to the inner surface of the pole sleeve; and
    further comprising a sliding element provided between the second section of the pole shank and the inner surface of the pole sleeve such that the inner surface of the pole sleeve is not in contact with the pole shank.

2. The rechargeable battery of claim 1 wherein the first section is provided toward a free end of the pole shank and the sliding element is surrounded at least in places by an attachment section of the pole sleeve which is used to attach the pole sleeve to the cover.

3. The rechargeable battery of claim 1 wherein the sliding element is provided in the form of an insert in the pole sleeve.

4. The rechargeable battery of claim 1 wherein the sliding element is integrally formed on the cover.

5. The rechargeable battery of claim 1 wherein the sliding element is provided in the form of a covering on the pole shank.

6. The rechargeable battery of claim 1 wherein the sliding element is provided in the form of a coating on the pole shank.

7. The rechargeable battery of claim 1 wherein the pole sleeve comprises an insertion opening formed by a circumferential incline which enlarges the internal diameter of the pole sleeve and wherein the sliding element is provided in the form of a ring which is provided on the insertion opening in the pole sleeve.

8. The rechargeable battery of claim 1 wherein the sliding element is formed from plastic.

9. The rechargeable battery of claim 1 wherein the sliding element is formed from polypropylene and is configured to reduce the sliding friction between the pole shank and the pole sleeve during insertion of the pole shank into the pole sleeve.

10. The rechargeable battery of claim 1 wherein the first section of the pole shank and the pole sleeve are configured so that an intermediate space is formed between the first section of the pole shank and the pole sleeve when the pole shank is inserted into the pole sleeve.

11. The rechargeable battery of claim 10 further comprising a lead solder provided in the intermediate space to electrically conductively connect the first section to the pole sleeve.

12. The rechargeable battery of claim 11 wherein the first and second sections are substantially cylindrical.

* * * * *